(12) United States Patent
Ouellette et al.

(10) Patent No.: US 7,762,534 B2
(45) Date of Patent: Jul. 27, 2010

(54) METHOD AND APPARATUS FOR SUPPORTING TURBINE COMPONENTS FOR MANUFACTURE

(75) Inventors: Randall Maurice Ouellette, Proctor, VT (US); Stefan Andreas Moser, West Chester, OH (US); James Henry Madge, Erie, PA (US)

(73) Assignee: General Electric Company, Schenectady, NY (US)

( * ) Notice: Subject to any disclaimer, the term of this patent is extended or adjusted under 35 U.S.C. 154(b) by 692 days.

(21) Appl. No.: 10/862,512

(22) Filed: Jun. 7, 2004

(65) Prior Publication Data

US 2005/0268463 A1    Dec. 8, 2005

(51) Int. Cl.
B23Q 3/08 (2006.01)
(52) U.S. Cl. .......................... 269/32; 29/281.1; 29/559; 269/309; 269/291
(58) Field of Classification Search ................... 269/32, 269/156, 309, 310, 91, 93, 94, 291; 29/281.1, 29/559
See application file for complete search history.

(56) References Cited

U.S. PATENT DOCUMENTS

| 1,063,332 | A | * | 6/1913 | Diehl | .......................... 269/249 |
|---|---|---|---|---|---|
| 1,328,492 | A | * | 1/1920 | Carman | ......................... 144/12 |
| 2,325,387 | A | * | 7/1943 | Fredrickson | .................. 269/94 |
| 3,032,331 | A | * | 5/1962 | Doty et. al. | .................... 269/34 |
| 3,436,072 | A | * | 4/1969 | Svenson | ....................... 269/94 |
| 3,988,126 | A |  | 10/1976 | DeMusis |  |
| 4,026,073 | A |  | 5/1977 | Betzler |  |
| 4,142,332 | A |  | 3/1979 | Clarke |  |
| 4,455,787 | A |  | 6/1984 | Sharon |  |
| 5,001,868 | A |  | 3/1991 | Jankus et al. |  |
| 5,097,634 | A |  | 3/1992 | Hulme |  |
| 5,494,408 | A |  | 2/1996 | Seeley et al. |  |
| 5,931,453 | A | * | 8/1999 | Brennan | ..................... 269/258 |
| 6,065,744 | A |  | 5/2000 | Lawrence |  |
| 6,237,907 | B1 |  | 5/2001 | Lawrence |  |
| 6,254,077 | B1 | * | 7/2001 | Riley, Jr. | ..................... 269/287 |
| 2005/0268463 | A1 | * | 12/2005 | Ouellette et al. | ......... 29/889.21 |

\* cited by examiner

Primary Examiner—Lee D Wilson
(74) Attorney, Agent, or Firm—William Scott Andes, Esq.; Armstrong Teasdale LLP

(57) ABSTRACT

A method enables a blade assembly to be secured for manufacture. The blade assembly includes an airfoil, a dovetail, and a platform extending therebetween. The method includes providing a fixture including at least one platform support assembly and at least one dovetail clamp assembly coupled to the fixture, wherein the platform support assembly includes a support member, a lever arm, and a biasing mechanism, locating the blade assembly within the fixture using a locator, positioning the platform support assembly against the blade assembly platform, and retaining the blade assembly in alignment with respect to the fixture using the at least one dovetail clamp assembly.

5 Claims, 5 Drawing Sheets

METHOD AND APPARATUS FOR SUPPORTING TURBINE COMPONENTS FOR MANUFACTURE

BACKGROUND OF THE INVENTION

This invention relates generally to manufacturing techniques and, more particularly, to methods and apparatus for supporting turbine components for manufacture.

Accurate manufacturing of a turbine component may be a significant factor in determining a manufacturing time of the component. Specifically, when the component is a gas turbine engine blade, accurate manufacturing of the blade may be one of the most significant factors affecting an overall cost of fabrication of the gas turbine engine, as well as subsequent modifications, repairs, and inspections of the blade. For example, at least some known gas turbine engine blades include a dovetail that typically requires an accurate milling process to create the dovetail profile and under platform surfaces. To maintain an accurate relationship between the pressure faces of the dovetail, the fixture generally must be held as rigidly as possible to facilitate preventing movement of the dovetail during machining passes. Generally, any movement of the during the machining process may result in poor dimensional stability, degraded surface finish and/or reduced tool life At least some known manufacturing processes encapsulate a cast gas turbine engine blade in an alloy that has low melting temperature, such as a tin-bismuth matrix. The encapsulate facilitates providing support to the blade during the machining process. However, such a material may not always enable accurate results to be produced, that are reliable or easily repeatable. More specifically, support facilitates preventing the blade from moving or deflecting due to the machining forces. In addition, using a matrix may require multiple fixtures, machines, and/or processes, thus increasing overall manufacturing time of the blade. Moreover, because the encapsulating material has to be cast around the airfoil, and then later removed, several non-value added steps are added to the manufacturing process.

BRIEF DESCRIPTION OF THE INVENTION

In one aspect, a method is provided for securing a blade assembly for manufacturing. The blade assembly includes an airfoil, a dovetail, and a platform extending therebetween. The method includes providing a fixture including at least one platform support assembly and at least one dovetail clamp assembly coupled to the fixture, wherein the platform support assembly includes a support member, a lever arm, and a biasing mechanism, locating the blade assembly within the fixture using a locator, positioning the platform support assembly against the blade assembly platform, and retaining the blade assembly in alignment with respect to the fixture using the at least one dovetail clamp assembly.

In another aspect, an apparatus is provided for manufacturing a blade assembly. The blade assembly includes an airfoil, a dovetail, and a platform extending therebetween. The apparatus includes a fixture and at least one platform support assembly coupled to the fixture. The platform support assembly includes a support member, a lever arm, and a biasing mechanism. The support member is movable with respect to the dovetail platform and the lever arm. The lever arm contacts the support member and the biasing mechanism. The biasing mechanism moves the lever arm and the support member in relation to the fixture. The apparatus also includes at least one dovetail clamp assembly that has a clamp arm that is moveable towards and away from the dovetail.

In yet another aspect, a support assembly is provided for supporting a blade assembly for manufacturing. The blade assembly includes an airfoil, a dovetail, and a dovetail platform extending therebetween. The support assembly includes a support member having a first arm, a second arm, a support beam extending therebetween, and a pivoting member extending from the support beam. The first arm and the second arm extend from the support beam and contact the dovetail platform when the support assembly is supporting the blade assembly. The pivoting member extends from an opposing side of the support beams towards a lever arm. The lever arm includes a first end, a second end, and a groove extending at least partially therebetween, wherein the pivoting member is pivotably coupled to the lever arm within the groove. The support assembly also includes a biasing mechanism coupled to the lever arm first end, wherein the biasing mechanism moves the lever arm and the support member towards and away from the dovetail platform.

DETAILED DESCRIPTION OF THE INVENTION

As used herein, the terms "manufacture" and "manufacturing" may include any manufacturing process. For example, manufacturing processes may include grinding, finishing, polishing, cutting, machining, inspecting, and/or casting. The above examples are intended as exemplary only, and thus are not intended to limit in any way the definition and/or meaning of the terms "manufacture" and "manufacturing". In addition, as used herein the term "component" may include any object to which a manufacturing process is applied. Furthermore, although the invention is described herein in association with a gas turbine engine, and more specifically for use with a turbine blade assembly for a gas turbine engine, it should be understood that the present invention may be applicable to any component and/or any manufacturing process. Accordingly, practice of the present invention is not limited to the manufacture of turbine blades or other components of gas turbine engines.

Figure 1:
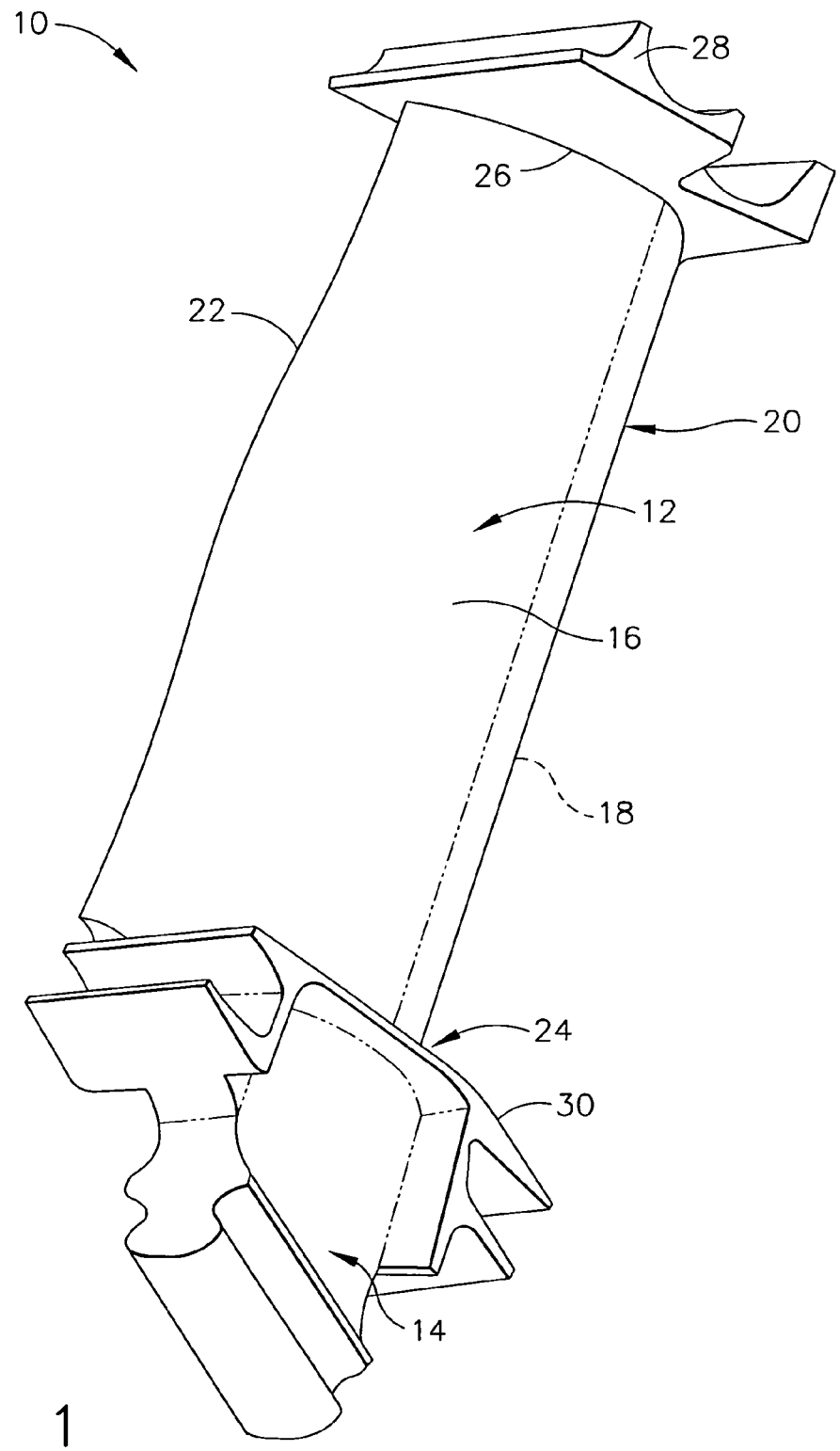
FIG. 1 is a perspective view of an exemplary blade assembly for use in a gas turbine engine.

FIG. 1 illustrates a perspective view of a blade assembly 10 that may be used with a gas turbine engine (not shown). In one embodiment, a plurality of blade assemblies 10 form a high-pressure turbine rotor blade stage (not shown) of the gas turbine engine. Each blade assembly 10 includes a hollow airfoil 12 and an integral dovetail 14 that is used for mounting airfoil 12 to a rotor disk (not shown) in a known manner. Alternatively, blade assemblies 10 may extend radially outwardly from a disk (not shown), such that a plurality of blade assemblies 10 form a blisk (not shown).

Each airfoil 12 includes a first contoured sidewall 16 and a second contoured sidewall 18. First sidewall 16 is convex and defines a suction side of airfoil 12, and second sidewall 18 is concave and defines a pressure side of airfoil 12. Sidewalls 16 and 18 are joined at a leading edge 20 and at an axially-spaced trailing edge 22 of airfoil 12. More specifically, airfoil trailing edge 22 is spaced chordwise and downstream from airfoil leading edge 20. First and second sidewalls 16 and 18, respectively, extend longitudinally or radially outward in span from a blade root 24 positioned adjacent dovetail 14, to an airfoil tip 26. In one embodiment, airfoil tip 26 includes a tip shroud 28 extending radially outward therefrom in a direction away from airfoil 12. A dovetail platform 30 is positioned at blade root 24 and extends radially outward from first and second sidewalls 16 and 18, respectively.

Figure 2:
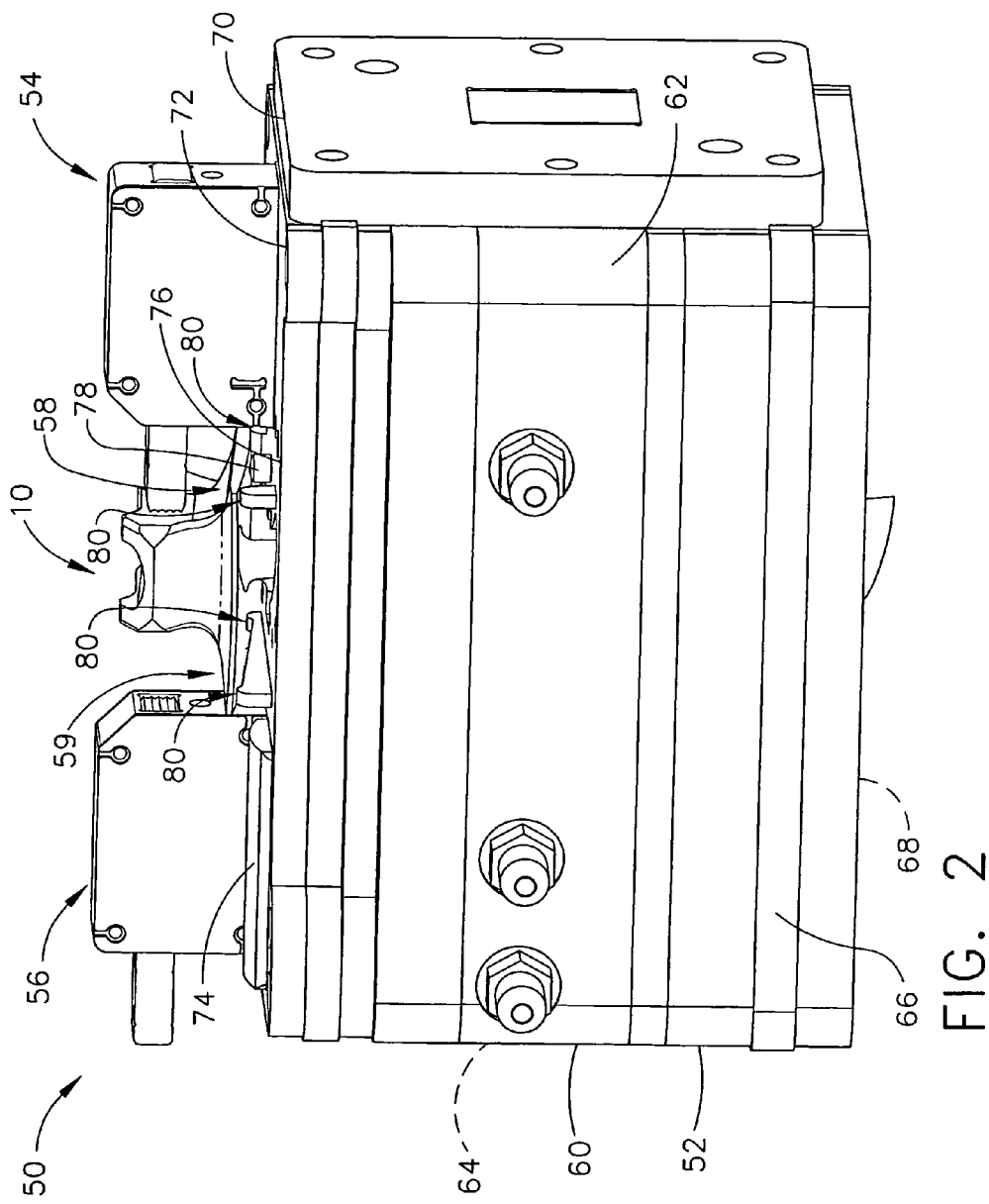
FIG. 2 is a perspective view of a fixture assembly used to support a component, such as the blade assembly shown in FIG. 1, during a machining process.

FIG. 2 is a perspective view of a fixture assembly 50 used to support and secure a component, such as blade assembly 10, during a manufacturing process. Fixture assembly 50 includes a fixture 52 used for manufacturing processes, a first dovetail clamp assembly 54 coupled to fixture 52, a second dovetail clamp assembly 56 coupled to fixture, a first platform support assembly 58, and a second platform support assembly 59 used for supporting blade assembly 10 in position prior to the manufacturing process.

First and second dovetail clamp assemblies 54 and 56, are coupled to fixture assembly 50 using any suitable coupling means. For example, in one embodiment, at least one of first and second dovetail clamp assembly 54 and 56 is coupled to fixture 52 using threaded bolts and threaded nuts. In another embodiment, at least one of first and second dovetail clamp assembly 54 and 56 are coupled to fixture 52 using threaded bolts and threaded openings in fixture 52.

Fixture 52 includes an outer casing 60 having a first end wall 62, a second end wall 64, sidewalls 66 and 68 extending therebetween, and an upper surface 70 that extends between opposing sidewalls 66 and 68 and between end walls 62 and 64. Surface 70 is coupled to fixture 52 using any suitable coupling means such as, for example, using threaded bolts and threaded nuts or alternatively using threaded bolts and threaded openings in fixture 52.

Openings 72 and 74 are formed through top surface 70 proximate respective end walls 62 and 64 to enable first dovetail clamp assembly 54 and second dovetail clamp assembly 56, respectively, to extend beyond top surface 70 and to be positioned for retaining blade assembly 10 during the manufacturing process. Prior to undergoing a manufacturing process, blade assembly 10 is loaded into fixture assembly 50. Specifically, a blade assembly opening 76 extending through top surface 70 between openings 72 and 74, is sized to enable a blade assembly 10 to be loaded into fixture 52, and more particularly, onto first and second platform support assemblies 58 and 59, respectively, as is described in more detail below. A fixed locator 78 is coupled to upper surface 70 and extends a distance such that when blade assembly 10 is loaded into fixture assembly 50, fixed locator 78 defines a stop which prevents further loading of blade assembly 10. As such, fixed locator 78 facilitates initially positioning blade assembly 10 with respect to platform support assemblies 58 and 59.

Platform support assemblies 58 and 59 are generally located interior to fixture assembly outer casing 60 with a plurality of support arms 80 extending beyond top surface 70 to engage dovetail platform 30. Support arms 80 facilitate positioning blade assembly 10 in alignment relative to fixture assembly 50, such that blade assembly 10 can be retained by dovetail clamp assemblies 54 and 56, respectively. Support arms 80 also facilitate supporting blade assembly 10 from vertical movement in the downward direction during the manufacturing process.

In use, dovetail 14 of blade assembly 10 is properly positioned and aligned by platform support assemblies 58 and 59 such that dovetail 14 can be retained by first and second dovetail clamp assemblies 54 and 56, respectively. Accordingly, the combination of dovetail clamp assemblies 54 and/or 56 and platform support assemblies 58 and 59 facilitates locating, supporting, and retaining blade assembly 10 in alignment with respect to fixture 52 during manufacturing of blade assembly 10.

Figure 3:
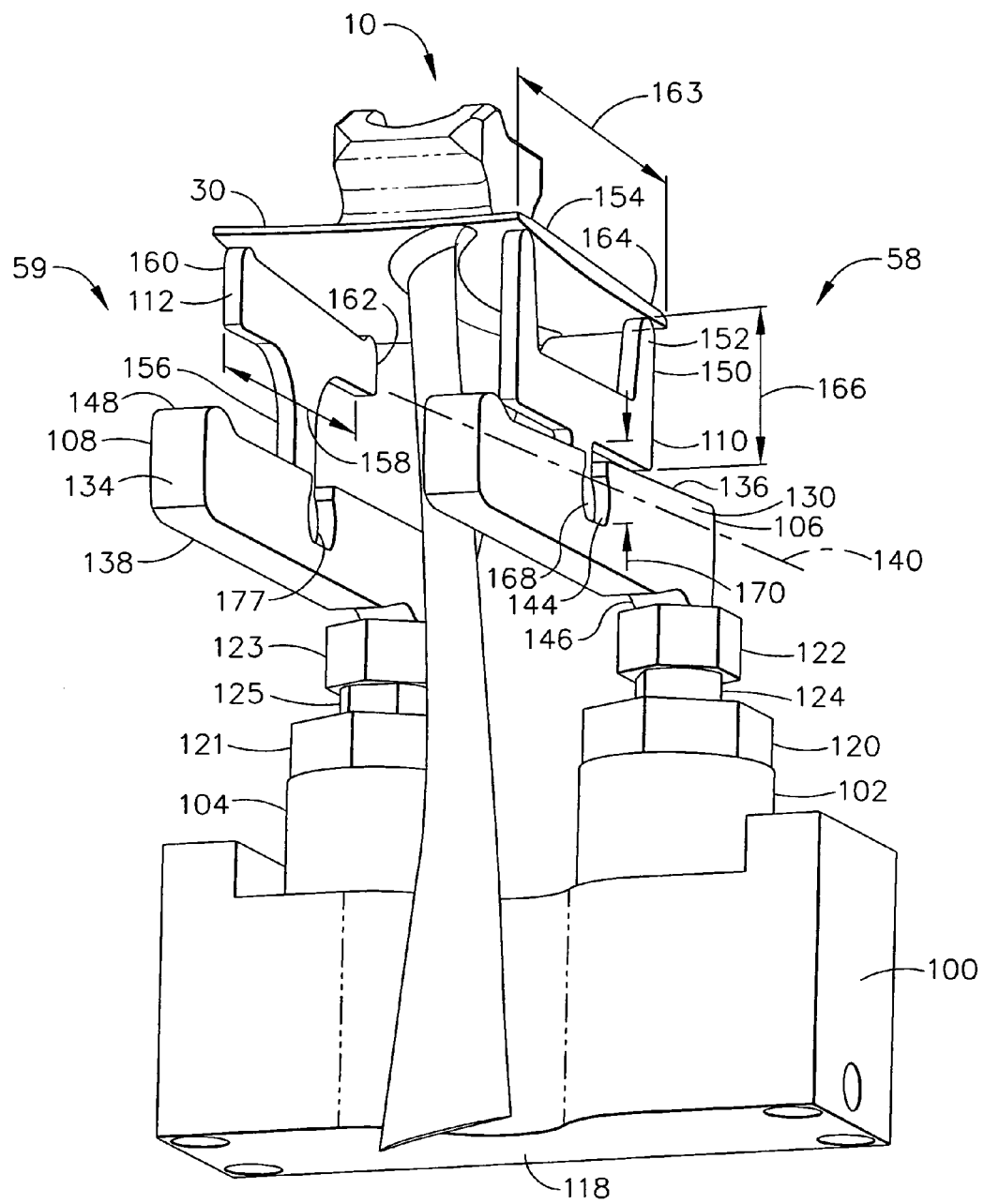
FIG. 3 is a perspective view of a portion of the fixture assembly shown in FIG. 2.
Figure 4:
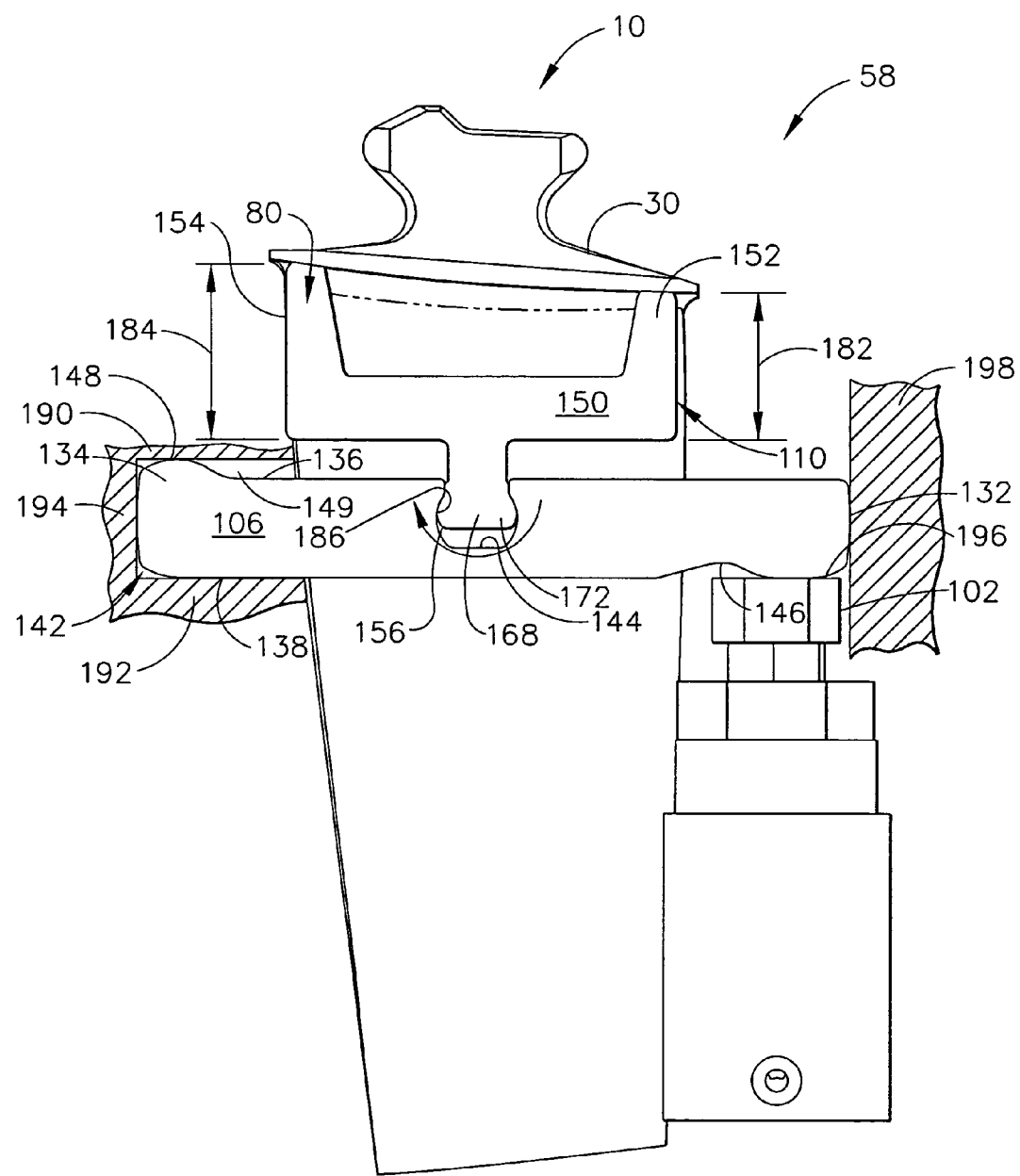
FIG. 4 is a side view of a portion of the fixture assembly shown in FIGS. 2 and 3.

FIG. 3 is a perspective view of a portion of fixture assembly 50, and illustrates the orientation of blade assembly 10 with respect to platform support assemblies 58 and 59. FIG. 4 is a side view of a portion of fixture assembly 50, and illustrates first platform support assembly 58 in a supporting position wherein blade assembly 10 is loaded into fixture 52 and support member 110 is in contact with dovetail platform 30. Each platform support assembly 58 and 59 is coupled to a base 100 and includes a respective biasing mechanism 102 and 104 that is coupled to base 100, a respective lever arm, or transfer bar, 106 and 108 that contacts each biasing mechanism 102 and 104, and a respective support member 110 and 112 that contacts each lever arm 106 and 108, respectively. Base 100 is secured to fixture 50, and in the exemplary embodiment, is a hydraulic manifold that is fluidly coupled to an external hydraulic fluid source (not shown). In the exemplary embodiment, base 100 includes a recess 118 that is sized to receive airfoil 12 when blade assembly 10 is loaded into fixture assembly 50.

Biasing mechanisms 102 and 104 extend from base 100 and contact lever arms 106 and 108, respectively. Biasing mechanisms 102 and 104 are positionable between an activated and a de-activated position. In the exemplary embodiment, biasing mechanisms 102 and 104 are hydraulically activated supports that each include a hydraulic cylinder 120 and 121. Each cylinder 120 and 121 includes a rod 122 and 123, respectively, and is fluidly coupled to fixture assembly 50. When pressure is applied to hydraulic cylinders 120 and 121, each rod 122 and 123 extends outwardly through a respective opening 124 and 125 in respective hydraulic cylinders 120 and 121 towards a respective platform support assembly 58 and 59. In the exemplary embodiment, rods 122 and 123 extend towards top surface 70 and dovetail platform 30.

Lever arms 106 and 108 each have a substantially rectangular body 130 that has a first end 132, a second end 134, a top surface 136, and a bottom surface 138. Body 130 has a longitudinal axis 140 that extends substantially parallel to fixture top surface 70. Each lever arm 106 and 108 extends from biasing mechanism 102 and 104, respectively, at first end 132 to a fixture cavity 142 at second end 134. Each biasing mechanism 102 and 104 contacts each lever arm bottom surface 138 adjacent each first end 132, such that when biasing mechanism 102 or 104 is activated, lever arm first end 132 is moved in a generally vertical direction. In the exemplary embodiment, each lever arm 106 and 108 includes a groove 144 defined within top surface 136. Each groove 144 is substantially centered with respect to first and second ends 132 and 134, and is sized to receive a portion of support member 110 or 112 therein. Each lever arm 106 and 108 includes a divot 146 that is positioned adjacent each first end 132 on bottom surface 138. Each divot 146 is sized to receive at least a portion of each biasing mechanism 102 or 104 as lever arm 106 or 108 is lifted. Each lever arm 106 and 108 includes a projection 148 extending outward from each arm top surface 136 adjacent to second end 134. Each projection 148 provides a gap 149 between top surface 136 and cavity 142 which prevents lever arms 106 and 108 from contacting cavity 142 when lever arms 106 and 108 are rotated.

Support members 110 and 112 each include a support beam 150, a first arm 152, a second arm 154, and a pivoting member 156. Support beam 150 extends substantially parallel to, and is positioned between a respective lever arm 106 or 108 and dovetail platform 30. Support beam 150 has a length 158 measured between a first end 160 and a second end 162. Length 158 is substantially equal to a length 163 of dovetail platform 30. First and second arms 152 and 154 each extend from support beam first and second ends 160 and 162 towards dovetail platform 30 and each has a rounded top end 164 that enables dovetail platform 30 to be rotated on top end 164. First and second arms 152 and 154 extend between support beam 150 and dovetail platform 30, and remain a distance (not shown) from platform 30 when biasing mechanisms 102 and 104 are in the de-activated position. In the exemplary embodiment, arms 152 and 154 each extend outwardly a length 182 and 184, respectively, as shown in FIG. 4. Lengths 182 and 184 enable fixed locator 80 to extend partially between support beam 150 and dovetail platform 30. In one embodiment, first arm 152 extends length 182 that is different than length 184 of second arm 154. In another embodiment, lengths 182 and 184 are substantially equal. In an alternative embodiment, arms 152 and 154 do not extend to enable fixed locator 78 to extend between support beam 150 and dovetail platform 30.

Pivoting member 156 extends from support beam 150 in an opposite direction than arms 152 and 154, and contacts each respective lever arm 106 or 108 at a pivot point 168. In the exemplary embodiment, pivoting member 156 is substantially centered with respect to support beam first and second ends 160 and 162, and has a length 170 that is less then the distance between lever arm 106 and 108 and dovetail platform 30 when biasing mechanism 102 and 104 is in the de-activated position. Accordingly, length 170 enables support member 110 or 112 to be positioned between lever arm 106 or 108, respectively, and dovetail platform 30. Pivot member 156 has a rounded end 172 that is opposite support beam 150 and is sized for insertion into lever arm groove 144.

In use, when platform support assembly 58 is in the de-activated position, blade assembly 10 is inserted into blade assembly opening 76 until dovetail platform 30 is against fixed locator 78. In one embodiment, a gap, or space, (not shown) is defined between first and/or second support member arms 152 and/or 154 and platform 30 when platform support assembly 58 is in the de-activated position.

In the exemplary embodiment, support beam 150 extends substantially horizontally, and support arms 152 and 154 each extend substantially vertically towards platform 30. Support member arms 152 and 154 have lengths 182 and 184 that enables fixed locator 78 to be positioned between support beam 150 and platform 30. Pivoting member 156 extends substantially vertically from support beam 150 to lever arm 106, and is pivotably coupled within lever arm groove 144 such that beam 150 contacts lever arm 106 at pivot point 168. Groove sidewalls 186 extend around pivot member end 172 to facilitate retaining pivot member end 172 within each groove 144.

Lever arm 106 extends substantially horizontally from biasing mechanism 102 to fixture cavity 142. Fixture cavity 142 has a top wall 190, a bottom wall 192, and an end wall 194. Bottom wall 192 supports lever arm bottom surface 138 and top wall 190 contacts lever arm top surface 136 to facilitate preventing lever arm 106 from translating in the vertical direction. End wall 194 contacts lever arm second end 134 to substantially prevent movement of lever arm 106 in the horizontal direction. Accordingly, lever arm second end 134 is positioned within fixture cavity 142 such that lever arm second end 134 is prevented from moving in the horizontal or vertical directions with respect to the fixture 52, however, lever arm second end 134 is capable of rotating or pivoting about second end 134. Lever arm first end 132 contacts a top surface 196 of biasing mechanism 102 and is in abutting contact with an end wall 198 positioned adjacent to biasing mechanism 102. Accordingly, end wall 198 prevents movement of lever arm 106 in the horizontal direction and, as such, lever arm first end 132 is only capable of moving in the vertical direction. In an alternative embodiment, lever arm second end 134 is coupled to fixture by a hinge (not shown). In another alternative embodiment, lever arm second end 134 is moveable in the horizontal direction. In yet another alternative embodiment, lever arm second end 134 is in contact with a biasing mechanism and is moveable in a direction that is substantially parallel to lever arm first end 132.

In the exemplary embodiment, when biasing mechanism 102 is activated, biasing mechanism top surface 196 extends outwardly with respect to base 100 in a substantially vertical direction. Accordingly, biasing mechanism exerts a small vertical force on lever arm 106 which raises lever arm first end 132 slightly. Due to the confinement of lever arm second end 134 by fixture cavity 142, lever arm 106 is forced to rotate about second end 134. As lever arm 106 is rotated, support member 110 is raised towards dovetail platform 30 until either first or second arm 152 or 154 contacts platform 30. Once initial contact is made, support member 110 rotates about pivot point 168 in lever arm groove 144 until the opposing arm 152 or 154 contacts platform 30. Biasing mechanism 110 ceases extending once first and second arms 152 and 154 contact platform 30, such that no additional vertical motion occurs until biasing mechanism 110 is de-activated. In the exemplary embodiment, fixture assembly 50 includes first and second platform support assemblies 58 and 59, and each acts independent of the other, such that first biasing mechanism 102 may continue extending even after second biasing mechanism 104 has stopped, and vice versa, thereby conforming to different blade assemblies 10 accordingly.

Figure 5:
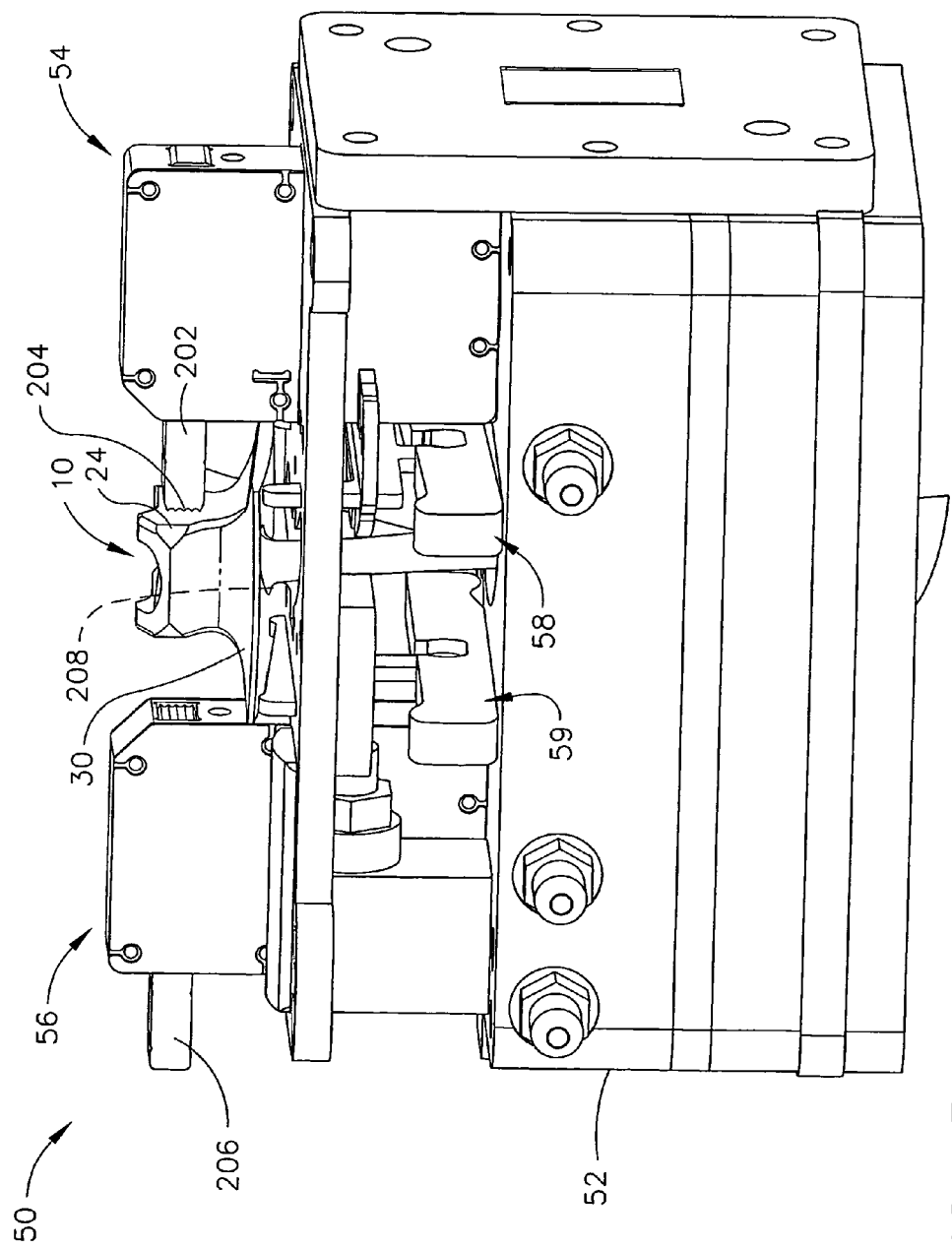
FIG. 5 is a perspective view of a portion of the fixture assembly shown in FIG. 1.

FIG. 5 is a perspective view of a portion of fixture assembly 50, and illustrates a portion of fixture 52 removed. Fixture assembly 50 facilitates locating, supporting, and retaining blade assembly 10 in alignment with respect to fixture 52 during manufacturing of blade assembly 10. Blade assembly 10 is shown in the supported position such that first and second platform support assemblies 58 and 59, respectively, are activated and are contacting and supporting dovetail platform 30. Specifically, dovetail platform 30 is supported by a plurality of support arms 80 extending from platform support assemblies 58 and 59. After blade assembly 10 is supported by platform support assemblies 58 and 59, dovetail clamp assemblies 54 and 56 are activated to retain dovetail 14 in a fixed position for manufacturing.

In use, first dovetail clamp assembly 54 is activated such that first clamp arm 202 extends along a substantially linear path and contacts dovetail 14 at a first contact point 204, and then second dovetail clamp 56 is activated such that second clamp arm 206 extends along a substantially linear path and contacts dovetail 14 at a second contact point 208 which is generally opposed from first contact point 204. Dovetail 14 is retained between clamp arms 202 and 206. Accordingly, the encapsulate is not required to facilitate securing blade assembly during any manufacturing process.

In the exemplary embodiment, clamp arms 202 and 206 extend along a substantially co-linear path. In an alternative embodiment, at least one clamp arm 202 and/or 206 is rotatable such that clamp arm 202 and/or 206 extends along a curvilinear path. As illustrated in FIG. 5, first dovetail clamp assembly 54 is in an extended, or activated, position wherein clamp arm 202 is extended. Second blade clamp assembly 56 is in a retracted, or de-activated, position wherein clamp arm 206 is retracted.

The above-described fixture assembly is cost-effective and highly reliable means for supporting and retaining a component during manufacturing. The fixture assembly permits, a blade dovetail to be supported and retained during manufacturing. More specifically, the fixture assembly rigidly secures the blade dovetail in a position without requiring an encapsulate. The fixture assembly may also facilitate securing a blade dovetail during manufacturing without the use of multiple machines, fixtures, and/or processes. Accordingly, because the blade assembly is self-aligned once coupled to the fixture, the fixture assembly requires minimal input from an operator. As a result, the fixture assembly facilitates reducing manufacturing costs in a cost-effective and reliable manner.

Exemplary embodiments of fixture assemblies are described above in detail. The assemblies are not limited to the specific embodiments described herein, but rather, components of each assembly may be utilized independently and separately from other components described herein. Each fixture assembly component can also be used in combination with other tool assembly components.

While the invention has been described in terms of various specific embodiments, those skilled in the art will recognize that the invention can be practiced with modification within the spirit and scope of the claims.

What is claimed is:

1. An apparatus for machining a blade assembly including an airfoil, a dovetail, and a dovetail platform extending between the airfoil and the dovetail, said apparatus comprising:
   a fixture;
   a pair of platform support assemblies coupled to said fixture, each of said platform support assemblies operable independently of one another and comprising a support member, a lever arm, and a biasing mechanism, said support member comprising a support beam, a support arm, and a pivoting member, said support arm integrally formed with said support beam and extending from said support beam in a first direction, said pivoting member integrally formed with said support beam and extending from said support beam in a second direction that is substantially opposite the first direction such that an end of said pivoting member is at least partially inserted in said lever arm and is retained within a groove defined in said lever arm such that said support member is movable with respect to the dovetail platform and said lever arm; and
   at least one dovetail clamp assembly comprising a clamp arm that is moveable towards and away from the dovetail, wherein said clamp assembly is independently moveable with respect to said pair of platform support assemblies.

2. An apparatus in accordance with claim 1 wherein said biasing mechanism comprises a hydraulic work support, said lever arm configured to be hydraulically actuated by said hydraulic work support.

3. An apparatus in accordance with claim 2 wherein said lever arm is configured to be hydraulically actuated by said hydraulic work support in a substantially vertical direction.

4. An apparatus in accordance with claim 1 wherein said lever arm comprises a first end, a second end, and an axis extending from said first end to said second end, said first end adjacent a first wall, said first wall preventing movement in a first direction along the axis, said second end adjacent a second wall, said second wall preventing movement in a second direction along the axis, said biasing mechanism configured to move said lever arm in a third direction that is perpendicular to the axis.

5. An apparatus in accordance with claim 1 wherein said at least one dovetail clamp assembly comprises a first dovetail clamp assembly comprising a first clamp arm and a second dovetail clamp assembly comprising a second clamp arm, said first clamp arm and said second clamp arm moveable to facilitate retaining the dovetail between said first and second dovetail clamp assemblies.

* * * * *